(12) United States Patent
Bedoukian

(10) Patent No.: US 10,631,536 B2
(45) Date of Patent: *Apr. 28, 2020

(54) FORMULATIONS FOR KILLING BITING ARTHROPODS

(71) Applicant: BEDOUKIAN RESEARCH, INC., Danbury, CT (US)

(72) Inventor: Robert H. Bedoukian, West Redding, CT (US)

(73) Assignee: Bedoukian Research, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,042

(22) Filed: Sep. 11, 2018

(65) Prior Publication Data

US 2019/0075790 A1    Mar. 14, 2019

Related U.S. Application Data

(60) Provisional application No. 62/557,266, filed on Sep. 12, 2017.

(51) Int. Cl.
*A01N 31/06* (2006.01)
*A01N 35/06* (2006.01)
(Continued)

(52) U.S. Cl.
CPC ............. *A01N 31/06* (2013.01); *A01N 35/06* (2013.01); *A01N 37/36* (2013.01); *A01N 37/42* (2013.01);
(Continued)

(58) Field of Classification Search
CPC ............................. C07D 307/08; A01N 31/06
See application file for complete search history.

(56) References Cited

U.S. PATENT DOCUMENTS 7,884,130 B2    2/2011  Zucca et al.
10,172,349 B2 *  1/2019  Bedoukian ............. A01N 31/06
(Continued)

FOREIGN PATENT DOCUMENTS

WO    WO2013165477     * 11/2013
WO       2014053398 A1   4/2014

OTHER PUBLICATIONS

Metcalf's publication, Insect Control, 2012, Wiley-VCH, pp. 264-322.*

(Continued)

*Primary Examiner* — Rei Tsang Shiao
(74) *Attorney, Agent, or Firm* — Ohlandt, Greeley, Ruggiero & Perle, L.L.P.

(57) ABSTRACT

Killing one or more biting arthropods selected from the group consisting of mosquitoes, bed bugs and ticks is accomplished by bringing the biting arthropods into contact with a toxic amount of a formulation comprising: (1) one or more compounds of structure (I), wherein the compounds of structure (I) comprise:

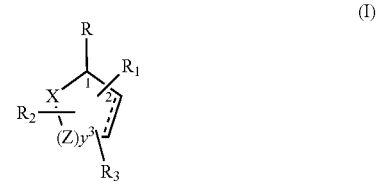

wherein R is selected from the group consisting of —OH, =O, —OC(O)$R_4$, —O$R_6$, —(O$R_6$)$_2$, wherein each $R_6$ is independently selected from an alkyl group containing from 1 to 4 carbon atoms and $R_4$ is a branched or straight chain, saturated or unsaturated hydrocarbyl group with zero to two double bonds and from 1 to 15 carbon atoms: X is O or $CH_2$, with the proviso that when X is O, then R can only be =O; each Z is independently selected from the group consisting of (CH) and ($CH_2$); y is a numeral selected from 1 and 2; $R_1$ is selected from the group consisting of H or a branched or straight chain, saturated or unsaturated hydrocarbyl group with zero to two double bonds and from 1 to 15 carbon atoms; $R_2$ is selected from the group consisting of H and a branched or straight chain, saturated or unsaturated hydrocarbyl group with zero to three double bonds and from 1 to 15 carbon atoms; $R_3$ is selected from the group consisting of H and a branched or straight chain, saturated or unsaturated hydrocarbyl group with zero to three double bonds and from 1 to 15 carbon atoms, —($CH_2$)$_n$OH, —C(O)O$R_5$, —$CH_2$C(O)O$R_7$, —$CH_2$C(O)$R_8$, —C(O)N$R_9$$R_{10}$, —$CH_2$C(O)N$R_{11}$$R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12; the bond between the 2 and 3 positions in the ring structure may be a single or a double bond; and wherein the compounds of structure (I) contain from 11 to 20 total carbon atoms; and (2) one or more toxicant compounds selected from the group consisting of pyrethroids, carbamates, and organophosphates. The formulation can be a synergistic formulation.

19 Claims, 4 Drawing Sheets

(51) Int. Cl.
*A01N 43/08* (2006.01)
*A01N 57/14* (2006.01)
*A01N 53/00* (2006.01)
*A01N 47/22* (2006.01)
*A01N 43/16* (2006.01)
*A01N 49/00* (2006.01)
*A01N 57/16* (2006.01)
*A01N 37/42* (2006.01)
*A01N 47/24* (2006.01)
*A01N 37/36* (2006.01)
*A01N 57/12* (2006.01)

(52) U.S. Cl.
CPC ............. *A01N 43/08* (2013.01); *A01N 43/16* (2013.01); *A01N 47/22* (2013.01); *A01N 47/24* (2013.01); *A01N 49/00* (2013.01); *A01N 53/00* (2013.01); *A01N 57/12* (2013.01); *A01N 57/14* (2013.01); *A01N 57/16* (2013.01); *A01N 2300/00* (2013.01)

(56) References Cited

U.S. PATENT DOCUMENTS

2015/0305331 A1* 10/2015 Gewehr ................ A01N 37/42
504/100
2016/0186168 A1 6/2016 Konieczka et al.

OTHER PUBLICATIONS

International Search Report and Written Opinion for corresponding application No. PCT/US18/50453, dated Jan. 4, 2019, 15 pages.

* cited by examiner

FORMULATIONS FOR KILLING BITING ARTHROPODS

RELATED APPLICATIONS

This application claims the benefit of U.S. Provisional Application Ser. No. 62/557,266, filed Sep. 12, 2017, which is incorporated herein by reference.

BACKGROUND OF THE DISCLOSURE

1. Field of the Disclosure

This disclosure relates to formulations, including synergistic formulations, used to kill biting arthropods, especially insects and arachnids.

2. Description of the Related Art

Many mammals, including humans, have suffered the action of biting arthropods, including mosquitoes, bed bugs and ticks. The blood sucking of mosquitoes results in an itching sensation and often a rash. Also, many mosquitoes cause potentially life-threatening illness. *Aedes aegypti* can cause dengue fever and yellow fever, *Anopheles quadrimaculatus* can cause malaria and *Culex quinquefasciatus* can cause West Nile disease.

Also, recent data suggests bed bug infestations (*Cimex* species) of human domiciles are on the rise. As with mosquitoes, bed bugs feed on human blood. At least 92 species of bed bugs have been identified globally, of which at least 16 species are in the North American continent. Generally, bed bugs are parasitic pests with its hosts including humans and various domesticated animals. It is believed that bed bug infestations are becoming more problematic now at least in part because long acting, residual insecticides are no longer being used to keep bed bug populations in check. In addition, increased international travel and insecticide resistance have made bed bug infestations spread and made control with insecticides very difficult. In terms of scale, such infestations are of particular concern for hoteliers, cruise ships, trains, daycare facilities, and the like because of the business reputation risk posed by bad press or bad reviews. Other problematic areas tend to include nursing homes, barracks, dorms, hospitals, and various other forms of high density housing. Nonetheless, single family homes can likewise be impacted adversely.

Further, ticks feed on mammalian blood, including human blood. Several serious diseases are transmitted by ticks including, for example, anaplasmosis, Colorado tick fever, tularemia, and Rocky Mountain spotted fever. A prevalent tickborne disease in the United States is Lyme disease. Lyme disease is caused by the bacterium *Borrelia burgdorferi* and is transmitted to humans through the bite of infected black-legged ticks.

Pyrethroid, carbamate and organophosphate pesticides are commonly used against biting arthropods. Safety questions have been raised concerning the use of certain of these pesticides, and some governments have restricted the amount of the active component that may be employed in formulations. This itself presents a further problem since the efficacy of certain of these pesticides declines over time and therefore they need to be formulated at higher than effective dosages in order to maintain their effectiveness. Furthermore, some biting arthropods have developed resistance to certain of these pesticides due to their wide spread usage. Also, certain of these pesticides are relatively expensive.

Consumer research regarding the key attributes of arthropod toxicants strongly suggests that consumers prefer products with high efficacy, long-lasting protection, and safety in use. Leading arthropod toxicant products currently available to consumers claim to meet these requirements but almost always disappoint the user for having one or more unacceptable properties. Thus, there is a need to provide biting arthropod toxicant products, especially insect and arachnid toxicant products, which meet the preferences of consumers.

In particular, there is a need to provide a biting arthropod toxicant formulation, especially a mosquito, bed bug, tick, or other arthropod toxicant formulation, which minimizes exposure of toxicants to the people, plants, and other animals which may be exposed to areas of application. A further need is for a biting arthropod toxicant formulation, especially a mosquito, bed bug, tick, or other arthropod toxicant formulation, that overcomes or minimizes resistance to conventional pesticides and provides long lasting effects, thereby limiting the need for frequent re-application to treated areas.

A yet further need is for a biting arthropod toxicant formulation that is safe for humans, animals and the environment that can be used to kill mosquitoes, bed bugs, and ticks, and for safe and effective means to employ such chemicals.

The present disclosure provides many advantages, which shall become apparent as described below.

SUMMARY OF THE DISCLOSURE

In accordance with this disclosure, killing one or more biting arthropods selected from the group consisting of mosquitoes, bed bugs and ticks is obtained by bringing the biting arthropods into contact with a toxic amount of a formulation comprising:

(1) one or more compounds of structure (I), wherein the compounds of structure (I) comprise:

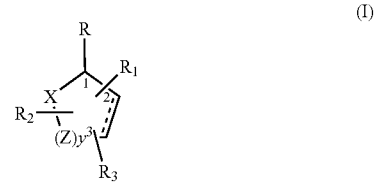

wherein

R is selected from the group consisting of —OH, =O, —OC(O)R$_4$, —OR$_6$, —(OR$_6$)$_2$, wherein each R$_6$ is independently selected from an alkyl group containing from 1 to 4 carbon atoms and R$_4$ is a branched or straight chain, saturated or unsaturated hydrocarbyl group with zero to two double bonds and from 1 to 15 carbon atoms;

X is O or CH$_2$, with the proviso that when X is O, then R can only be =O;

each Z is independently selected from the group consisting of (CH) and (CH$_2$);

y is a numeral selected from 1 and 2;

R$_1$ is selected from the group consisting of H or a branched or straight chain, saturated or unsaturated hydrocarbyl group with zero to two double bonds and from 1 to 15 carbon atoms;

R$_2$ is selected from the group consisting of H and a branched or straight chain, saturated or unsaturated hydrocarbyl group with zero to three double bonds and from 1 to 15 carbon atoms;

$R_3$ is selected from the group consisting of H and a branched or straight chain, saturated or unsaturated hydrocarbyl group with zero to three double bonds and from 1 to 15 carbon atoms, —$(CH_2)_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (I) contain from 11 to 20 total carbon atoms; and (2) one or more toxicant compounds selected from the group consisting of pyrethroids, carbamates, and organophosphates.

Also, in accordance with this disclosure, killing one or more biting arthropods selected from the group consisting of mosquitoes, bed bugs and ticks is obtained by bringing the biting arthropods into contact with a toxic amount of a synergistic or non-synergistic formulation comprising one or more of the compounds of structure (I) and one or more toxicant compounds selected from the group consisting of pyrethroids, carbamates, and organophosphates. The synergistic formulation produces, when the biting arthropods are brought into contact with the synergistic formulation, a combined toxicant effect greater than the sum of the separate toxicant effects from the separate compounds of structure (I) and toxicant compounds, at comparable concentrations.

Further, in accordance with this disclosure, killing one or more biting arthropods selected from the group consisting of mosquitoes, bed bugs and ticks is obtained by bringing the biting arthropods into contact with a toxic amount of a combination formulation comprising one or more of the compounds of structure (I) and one or more toxicant compounds selected from the group consisting of pyrethroids, carbamates, and organophosphates. The combination formulation produces, when the biting arthropods are brought into contact with the combination formulation, an effective combined toxicant effect that offers benefits such as reduced resistance to the formulation or reduced levels of conventional toxicant compounds (pyrethroids, carbamates, and organophosphates) in order to be effective.

This disclosure also includes optical isomers, diastereomers and enantiomers of the named structures. Thus, at all stereocenters where stereochemistry is not explicitly defined, all possible epimers are envisioned. As an aspect of this disclosure, the killing of the biting arthropods may be by way of the compounds being toxic to the biting arthropods and immatures thereof.

Further objects, features and advantages of the present disclosure will be understood by reference to the following detailed description.

DESCRIPTION OF THE EMBODIMENTS

Figure 1:
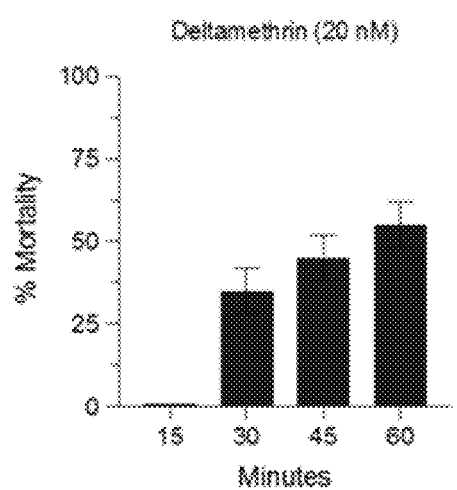
FIG. 1 graphically shows percent mortality for *Aedes aegypti* 3-5 d females with Deltamethrin (DM) using protocols in accordance with the Examples.

Killing one or more biting arthropods selected from the group consisting of mosquitoes, bed bugs and ticks is accomplished by bringing the biting arthropods into contact with a toxic amount of a formulation comprising:

(1) one or more compounds of structure (I), wherein the compounds of structure (I) comprise:

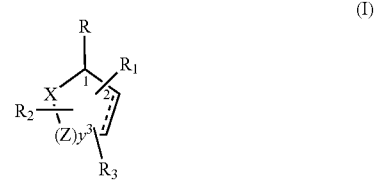

(I)

wherein

R is selected from the group consisting of —OH, =O, —OC(O)R$_4$, —OR$_6$, —(OR$_6$)$_2$, wherein each $R_6$ is independently selected from an alkyl group containing from 1 to 4 carbon atoms and $R_4$ is a branched or straight chain, saturated or unsaturated hydrocarbyl group with zero to two double bonds and from 1 to 15 carbon atoms;

X is O or CH$_2$, with the proviso that when X is O, then R can only be =O;

each Z is independently selected from the group consisting of (CH) and (CH$_2$);

y is a numeral selected from 1 and 2;

$R_1$ is selected from the group consisting of H or a branched or straight chain, saturated or unsaturated hydrocarbyl group with zero to two double bonds and from 1 to 15 carbon atoms;

$R_2$ is selected from the group consisting of H and a branched or straight chain, saturated or unsaturated hydrocarbyl group with zero to three double bonds and from 1 to 15 carbon atoms;

$R_3$ is selected from the group consisting of H and a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (I) contain from 11 to 20 total carbon atoms; and (2) one or more toxicant compounds selected from the group consisting of pyrethroids, carbamates, and organophosphates.

Also, killing one or more biting arthropods selected from the group consisting of mosquitoes, bed bugs and ticks is accomplished by bringing the biting arthropods into contact with a toxic amount of a synergistic or non-synergistic formulation comprising one or more compounds of structure (I), and one or more toxicant compounds selected from the group consisting of pyrethroids, carbamates, and organophosphates.

A preferred group of compounds of structure (I) are those wherein R is =O or —OH, X is $CH_2$, Z is (CH) or ($CH_2$), y is 1, the bond between positions 2 and 3 is a single bond, $R_1$ is H, $R_2$ is H, and $R_3$ is an alkenyl group having at least 11 carbon atoms and 1 or 2 double bonds.

A further preferred group of compounds of structure (I) are those wherein R is =O or —OH, X is $CH_2$, Z is (CH) or ($CH_2$), y is 1, the bond between positions 2 and 3 is a single bond, $R_1$ is an alkyl group having at least 5 carbon atoms, $R_2$ is H, and $R_3$ is —C(O)O$R_5$, and $R_3$ is an alkyl or alkenyl group containing at least 3 carbon atoms.

Another preferred group of compounds of structure (I) are those wherein R is =O, X is O, Z is CH or $CH_2$, y is 1 or 2, the bond between positions 2 and 3 is a single bond, $R_1$ is an alkyl group of from 7 to 11 carbon atoms, $R_2$ is H, and $R_3$ is H or $CH_3$.

An especially preferred group of compounds of structure (I) include methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and 3-methyl-5-heptyl-2-cyclohexenone.

Representative examples of compounds of structure (I) include, but are not limited to,

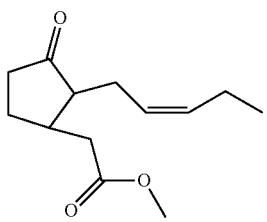

(Z)-methyl 2-(3-oxo-2-(pent-2-enyl)cyclopentyl)acetate
Chemical Formula: $C_{13}H_{20}O_3$
Molecular Weight: 224.30
Methyl Jasmonate

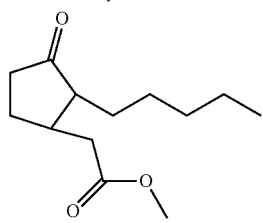

methyl 2-(3-oxo-2-pentylcyclopentyl)acetate
Chemical Formula: $C_{13}H_{22}O_3$
Molecular Weight: 226.31
Methyl Dihydro Jasmonate -continued

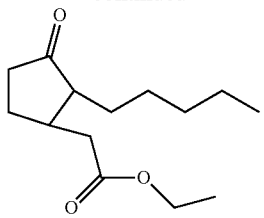

ethyl 2-(3-oxo-2-pentylcyclopentyl)acetate
Chemical Formula: $C_{14}H_{24}O_3$
Molecular Weight: 240.34
Ethyl Dihydro Jasmonate

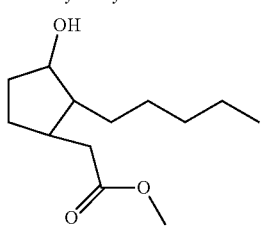

methyl 2-(3-hydroxy-2-pentylcyclopentyl)acetate
Chemical Formula: $C_{13}H_{24}O_3$
Molecular Weight: 228.33
Methyl Dihydro Jasmolate

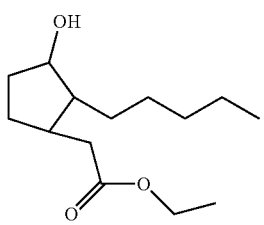

ethyl 2-(3-hydroxy-2-pentylcyclopentyl)acetate
Chemical Formula: $C_{14}H_{26}O_3$
Molecular Weight: 242.35
Ethyl Dihydro Jasmolate

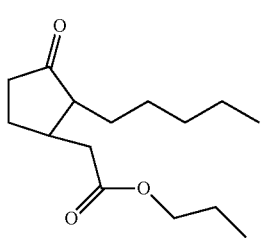

propyl 2-(3-oxo-2-pentylcyclopentyl)acetate
Chemical Formula: $C_{15}H_{26}O_3$
Molecular Weight: 254.37
Propyl Dihydro Jasmonate

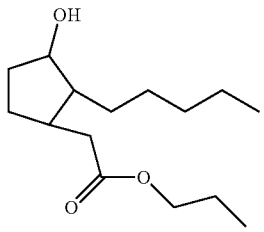

propyl 2-(3-hydroxy-2-pentylcyclopentyl)acetate
Chemical Formula: $C_{15}H_{28}O_3$
Molecular Weight: 256.38
Propyl Dihydro Jasmolate -continued

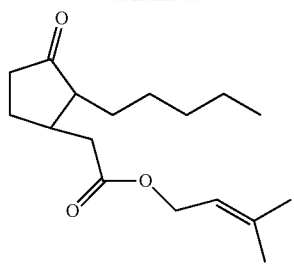

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate

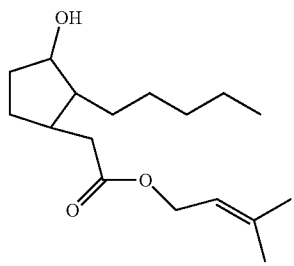

3-methylbut-2-enyl 2-(3-hydroxy-2-pentylcyclopentyl)acetate
Chemical Formula: $C_{17}H_{30}O_3$
Molecular Weight: 282.42
Prenyl Dihydro Jasmolate

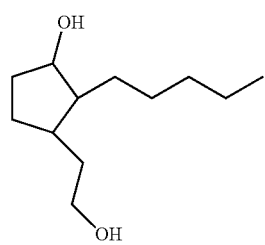

3-(2-hydroxyethyl)-2-pentylcyclopentanol
Chemical Formula: $C_{12}H_{24}O_2$
Molecular Weight: 200.32
MethylDihydroJasmodiol

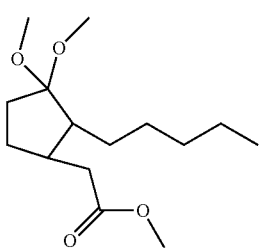

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal -continued

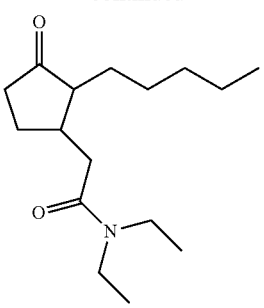

N,N-diethyl-2-(3-oxo-2-pentylcyclopentyl)acetamide
Chemical Formula: $C_{16}H_{29}NO_2$
Molecular Weight: 267.41
MDJ Amide

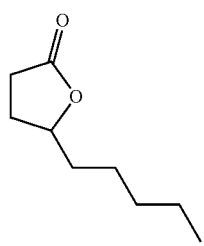

gamma Nonalactone
Chemical Formula: $C_9H_{16}O_2$
Molecular Weight: 156.22

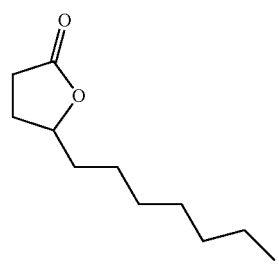

gamma Undecalactone
Chemical Formula: $C_{11}H_{20}O_2$
Molecular Weight: 184.28

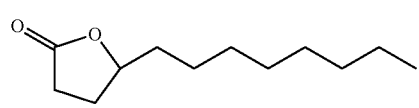

5-octyldihydrofuran-2(3H)-one
Chemical Formula: $C_{12}H_{22}O_2$
Molecular Weight: 198.30
gamma-dodecalactone

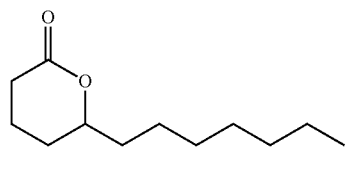

2H-Pyran-2-one, 6-heptyltetrahydro-
Chemical Formula: $C_{12}H_{22}O_2$
Molecular Weight: 198.31
Delta Dodecalactone -continued

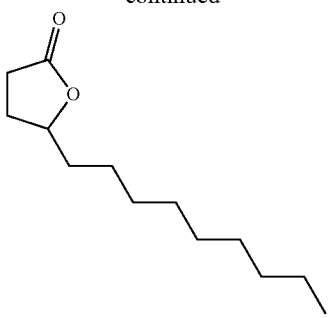

5-nonyldihydrofuran-2(3H)-one
Chemical Formula: $C_{13}H_{24}O_2$
Molecular Weight: 212.33
Gamma-Tridecalactone

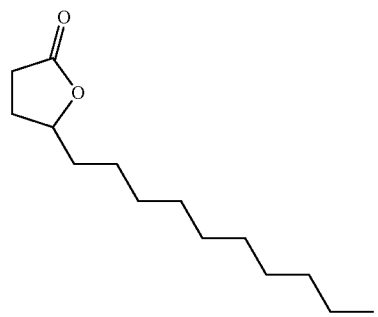

5-decyldihydrofuran-2(3H)-one
Chemical Formula: $C_{14}H_{26}O_2$
Molecular Weight: 226.36
Gamma-Tetradecalactone

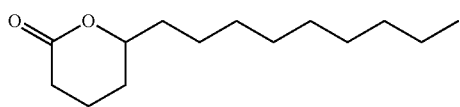

6-nonyltetrahydro-2H-pyran-2-one
Chemical Formula: $C_{14}H_{26}O_2$
Molecular Weight: 226.36
Delta-Tetradecalactone

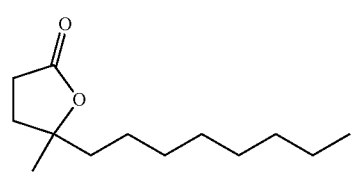

Gamma Methyl Dodecalactone
2(3H)-Furanone, 5-octyldihydro-5-methyl-

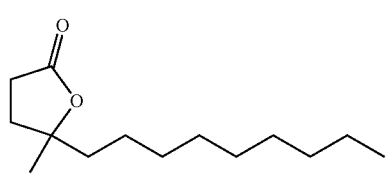

gamma Methyl Tridecalactone
5-methyl-5-nonyldihydrofuran-2(3H)-one
4-methyl-4-nonyl gamma butyrolactone
C14 lactone -continued

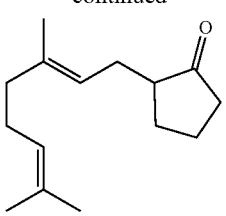

(E)-2-(3,7-dimethylocta-2,6-dienyl)cyclopentanone
Chemical Formula: $C_{15}H_{24}O$
Molecular Weight: 220.35
Apritone

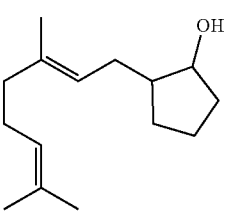

(E)-2-(3,7-dimethylocta-2,6-dienyl)cyclopentanol
Chemical Formula: $C_{15}H_{26}O$
Molecular Weight: 222.37
Apritol

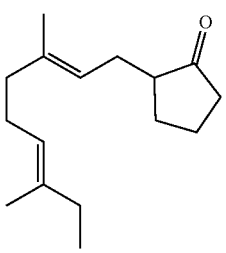

2-((2E,6E)-3,7-dimethylnona-2,6-dienyl)cyclopentanone
Chemical Formula: $C_{16}H_{26}O$
Molecular Weight: 234.38
Methyl Apritone

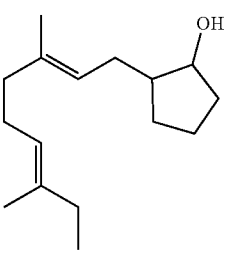

2-((2E,6E)-3,7-dimethylnona-2,6-dienyl)cyclopentanol
Chemical Formula: $C_{16}H_{28}O$
Molecular Weight: 236.39
Methyl Apritol -continued

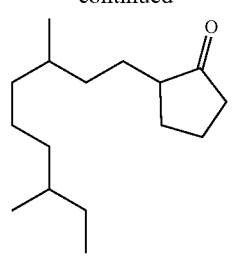

2-(3,7-dimethylnonyl)cyclopentanone
Chemical Formula: $C_{16}H_{30}O$
Molecular Weight: 238.41
Tetrahydromethyl Apritone

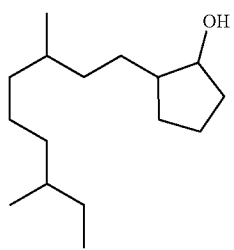

2-(3,7-dimethylnonyl)cyclopentanol
Chemical Formula: $C_{16}H_{32}O$
Molecular Weight: 240.42
Tetrahydromethyl Apritol

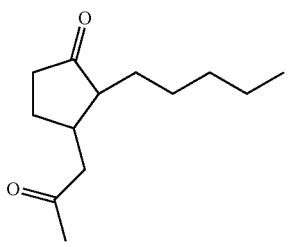

3-(2-oxopropyl)-2-pentylcyclopentanone
Chemical Formula: $C_{13}H_{22}O_2$
Molecular Weight: 210.31
Amyl Cyclopentanone Propanone

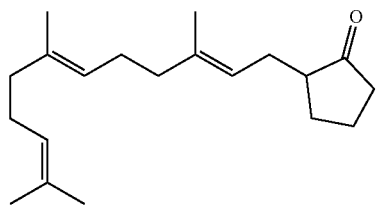

2-((2E,6E)-3,7,11-trimethyldodeca-2,6,10-trienyl)cyclopentanone
Chemical Formula: $C_{20}H_{32}O$
Molecular Weight: 288.47
Farnesylcyclopentanone -continued

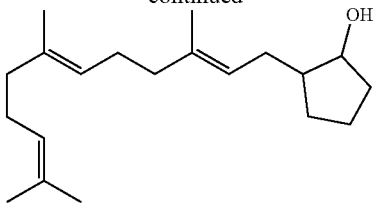

2-((2E,6E)-3,7,11-trimethyldodeca-2,6,10-trienyl)cyclopentanol
Chemical Formula: $C_{20}H_{34}O$
Molecular Weight: 290.48
Farnesylcyclopentanol

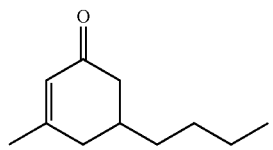

Chemical Formula: $C_{11}H_{18}O$
Molecular Weight: 166.26
3-methyl-5-butyl-2-cyclohexenone

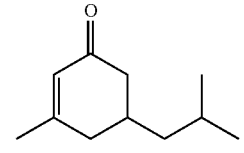

Chemical Formula: $C_{11}H_{18}O$
Molecular Weight: 166.26
3-methyl-5-isobutyl-2-cyclohexenone

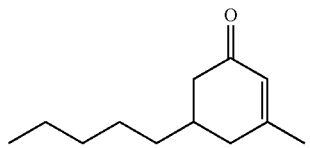

5-pentyl-3-methyl-2-cyclohexenone
Chemical Formula: $C_{12}H_{20}O$
Molecular Weight: 180.29

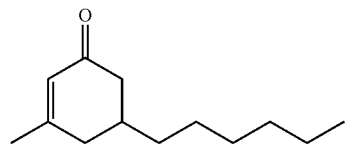

Chemical Formula: $C_{13}H_{22}O$
Molecular Weight: 194.31
3-methyl-5-hexyl-2-cyclohexenone

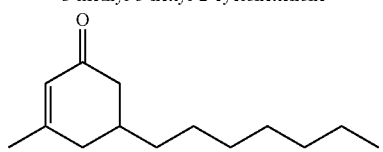

Chemical Formula: $C_{14}H_{24}O$
Molecular Weight: 208.34
3-methyl-5-heptyl-2-cyclohexenone

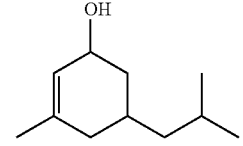

Chemical Formula: $C_{11}H_{20}O$
Molecular Weight: 166.28
3-methyl-5-isobutyl-2-cyclohexen-1-ol 3-methyl-5-heptyl-2-cyclohexen-1-ol
Chemical Formula: C14H26O
Molecular Weight: 210.36

Chemical Formula: C13H20O
Molecular Weight: 192.30
3-methyl-5-(z-3-hexenyl)-2-cyclohexenone 3-methyl-5-pentyl-2-cyclohexen-1-ol
Chemical Formula: C12H22O
Molecular Weight: 182.30

3-methyl-5-hexyl-2-cyclohexenol
Chemical Formula: $C_{13}H_{24}O$
Molecular Weight: 196.18

The conventional toxicant compounds useful in the formulations of this disclosure include, for example, pyrethroids, carbamates, and organophosphates.

Illustrative pyrethroid compounds useful in the formulations of this disclosure include, for example, bifenthrin, cypermethrin, zeta-cypermethrin, esfenvalerate, lambda-cyhalothrin, permethrin, cyfluthrin, alpha-cypermethrin, beta-cyfluthrin, tau-fluvalinate, gamma-cyhalothrin, deltamethrin, resmethrin, prallenthrin, fenpropathrin, tralomethrin, tetramethrin, phenothrin, and the like.

Illustrative carbamate compounds useful in the formulations of this disclosure include, for example, carbaryl, propoxur, oxamyl, aldicarb, terbucarb, and the like.

Illustrative organophosphate compounds useful in the formulations of this disclosure include, for example, parathion, malathion, methyl parathion, chlorpyrifos, diazinon, dichlorvos, phosmet, fenitrothion, naled (dibrom), temephos, diazinon, terbufos, and the like.

The active compounds of structure (I) and conventional toxicant compounds may be formulated into any suitable formulations such as for example, including but not limited to, solutions, oils, creams, lotions, shampoos, aerosols or the like. Traditional inert carriers such as, including but not limited to, alcohols, esters and petroleum distillates, could be used to produce formulations of the active compounds to be used as toxicant formulations. Another series of carriers are the biodegradable oils, including but not limited to, the Olestra® family of oils, isopropyl myristate and squalane.

When the formulation will be used as an aerosol, it is preferable to add a propellant. Suitable propellants include propane, butane, isobutane, dimethyl ether, carbon dioxide, nitrous oxide, nitrogen, and combinations thereof.

The amount of the formulation comprising the at least one compound of structure (I) and the at least one conventional toxicant will depend upon the type of formulation used and the particular biting insect, arachnid or other arthropod against which the formulation is employed, but will generally range from about 0.005% to 50% by weight, or from about 0.01% to about 30% by weight, or from about 0.05% to about 25% by weight, or from about 0.05% to about 20% by weight, or from about 0.05% to about 15% by weight, or from about 0.05% to about 10% by weight, or from about 0.05% to about 5% by weight, in a carrier.

In an embodiment, the formulation comprising the at least one compound of structure (I) and the at least one conventional toxicant can be present in an amount from about 0.01 to about 50% by weight or greater, in a carrier, and in a weight ratio of one or more toxicant compounds to one or more compounds of structure (I) from about 2000:1 to about 1:2000 preferably a weight ratio from about 1:1 to about 1:2000, or from about 1:1 to about 1:1500, or from about 1:1 to about 1:1000, or from about 1:1 to about 1:500, or from about 1:1 to about 1:100, or from about 1:1 to about 1:10.

In another embodiment, the formulation comprising the at least one compound of structure (I) and the at least one conventional toxicant can be present in an amount from about 0.05 to about 30% by weight or greater, in a carrier, and in a weight ratio of one or more toxicant compounds to one or more compounds of structure (I) from about 1500:1 to about 1:1500, preferably a weight ratio from about 1:1 to about 1:1500, or from about 1:1 to about 1:1000, or from about 1:1 to about 1:500, or from about 1:1 to about 1:100, or from about 1:1 to about 1:10.

In yet another embodiment, the formulation comprising the at least one compound of structure (I) and the at least one conventional toxicant can be present in an amount from about 0.1 to about 25% by weight or greater, in a carrier, and in a weight ratio of one or more toxicant compounds to one or more compounds of structure (I) from about 1000:1 to about 1:1000, preferably a weight ratio from about 1:1 to about 1:1000, or from about 1:1 to about 1:500, or from about 1:1 to about 1:100, or from about 1:1 to about 1:10.

In still another embodiment, the formulation comprising the at least one compound of structure (I) and the at least one conventional toxicant can be present in an amount from about 0.5 to about 20% by weight or greater, in a carrier, and in a weight ratio of one or more toxicant compounds to one or more compounds of structure (I) from about 500:1 to about 1:500, preferably a weight ratio from about 1:1 to about 1:500, or from about 1:1 to about 1:100, or from about 1:1 to about 1:10.

In another embodiment, the formulation comprising at least one compound of structure (I) selected from the group consisting of methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2- cyclohexenone, and the at least one toxicant, is present in an amount from about 0.01 to about 50% by weight or greater, in a carrier, and in a weight ratio of one or more toxicant compounds to one or more compounds of structure (I) from about 2000:1 to about 1:2000, preferably a weight ratio from about 1:1 to about 1:2000, or from about 1:1 to about 1:1500, or from about 1:1 to about 1:1000, or from about 1:1 to about 1:500, or from about 1:1 to about 1:100, or from about 1:1 to about 1:10.

In yet another embodiment, the formulation comprising at least one compound of structure (I) selected from the group consisting of methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the at least one toxicant, is present in an amount from about 0.1 to about 25% by weight or greater, in a carrier, and in a weight ratio of one or more toxicant compounds to one or more compounds of structure (I) from about 1000:1 to about 1:1000, preferably a weight ratio from about 1:1 to about 1:1000, or from about 1:1 to about 1:500, or from about 1:1 to about 1:100, or from about 1:1 to about 1:10.

In still another embodiment, the formulation comprising at least one compound of structure (I) selected from the group consisting of methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the at least one toxicant, is present in an amount from about 0.5 to about 20% by weight or greater, in a carrier, and in a weight ratio of one or more toxicant compounds to one or more compounds of structure (I) from about 500:1 to about 1:500, preferably a weight ratio from about 1:1 to about 1:500, or from about 1:1 to about 1:100, or from about 1:1 to about 1:10.

The amount of the formulation will depend upon the type of formulation used and the particular biting arthropod against which the formulation is employed, but will generally range from about 0.00001% to about 50% by weight, from about 0.0001% to about 30% by weight, or from about 0.001% to about 25% by weight, or from about 0.01% to about 20% by weight, or from about 0.01% to about 15% by weight, or from about 0.01% to about 10% by weight, or from about 0.01% to about 5% by weight, in a carrier.

The formulation may be applied to surfaces of, or impregnated in, clothing or fabric. The formulation may be applied to fabrics such as, but not limited to mosquito nets. The amount of active material can be about 0.0125 g/ft$^2$ to about 15 g/ft$^2$, or about 0.015 g/ft$^2$ to about 14 g/ft$^2$, or about 0.015 g/ft$^2$ to about 12 g/ft$^2$, or about 0.015 g/ft$^2$ to about 10 g/ft$^2$, or about 0.015 g/ft$^2$ to about 8 g/ft$^2$, or about 0.015 g/ft$^2$ to about 6 g/ft$^2$, or about 0.015 g/ft$^2$ to about 5 g/ft$^2$, or about 0.015 g/ft$^2$ to about 4 g/ft$^2$, or about 0.015 g/ft$^2$ to about 2 g/ft$^2$, or about 0.015 g/ft$^2$ to about 1 g/ft$^2$.

The formulation may be applied to outdoor materials such as, but not limited to, lawns, trees, shrubbery, or flooring to prevent the biting arthropods from resting there. Also, the formulation may be applied to indoor materials or fabrics such as, but not limited to bed nets or mosquito nets. For outdoor and indoor surfaces, the amount of active material can be about 0.125 g/m$^2$ to about 150 g/m$^2$, or about 0.125 g/m$^2$ to about 140 g/m$^2$, or about 0.125 g/m$^2$ to about 130 g/m$^2$, or about 0.125 g/m$^2$ to about 120 g/m$^2$, or about 0.125 g/m$^2$ to about 110 g/m$^2$, or about 0.125 g/m$^2$ to about 100 g/m$^2$, or about 0.125 g/m$^2$ to about 90 g/m$^2$, or about 0.125 g/m$^2$ to about 80 g/m$^2$, or about 0.125 g/m$^2$ to about 70 g/m$^2$, or about 0.125 g/m$^2$ to about 60 g/m$^2$, or about 0.125 g/m$^2$ to about 50 g/m$^2$, or about 0.125 g/m$^2$ to about 40 g/m$^2$, or about 0.125 g/m$^2$ to about 30 g/m$^2$, or about 0.125 g/m$^2$ to about 25 g/m$^2$, or about 0.125 g/m$^2$ to about 20 g/m$^2$, or about 0.125 g/m$^2$ to about 15 g/m$^2$, or about 0.125 g/m$^2$ to about 10 g/m$^2$, or about 0.125 g/m$^2$ to about 5 g/m$^2$.

The formulation may also be applied to outdoor materials such as, but not limited to, lawns, trees, shrubbery, or flooring to prevent the biting arthropods from resting there.

For bed bugs and other biting arthropods, the formulation may be employed by various methods including, for example, (1) injecting or spraying the formulations into or onto a mattress, either directly or in combination with other ingredients or solvents, (2) placing the formulations on an absorbent material and placing the absorbent material in a sachet and placing the sachet containing the formulation into a locus such as, including but not limited to, a mattress, hamper, suitcase, clothing bag, linen storage closet or any other enclosure where bed bugs may be present, (3) preparing "dryer sheets" containing the formulations for placement in a locus such as, including but not limited to, a mattress, suitcase, clothing bag, hamper, clothing bag, linen storage closet, or any other enclosure where bed bugs are likely to be present, or in a pile of clean or soiled laundry, (4) placing the formulation into detergent or fabric softener compositions for killing of bed bugs and other arthropods during use of these compositions in cleaning clothes and sprays or in carpet or floor cleaner products and the like to treat carpets and furniture, and (5) spraying a formulation on surfaces, luggage, furniture, into crevices, or behind fixtures.

The formulations described above can be prepared by any convenient means, e.g., by mixing the active compound of structure (I) and the conventional toxicant compound with one or more other carriers or vehicles such as, including but not limited to, those described herein before.

Following the definition of synergy (the interaction or cooperation of two or more organizations, substances, or other agents to produce a combined effect greater than the sum of their separate effects), an 'additive measure' can be used to determine synergy in the laboratory testing, as well as in field testing. To determine significant differences between treatments, the Log Dose Probit method and generated LDP lines (for dose response curves) can be used to determine the LD50 (the effective dose required to achieve 50% toxicity) of individual compounds and then the compounds can be combined to determine if significantly less amount of material is needed to create the same effect. Significance can be determined by the use of 95% confidence intervals. If confidence intervals do not overlap, there is a significant difference in treatments.

For testing purposes, additive toxicity can be determined by adding the percent toxicity for each material or component used in the combination treatment. This "expected additive toxicity" can then be compared to the "actual toxicity" seen when the combination is tested.

For testing purposes, the LDP Line software can be used to determine "additive toxicity" differences. After generating the dose response curves, the percent dose required to generate an LD25 (25% toxicity) for each of the individual components can be combined and that % dose can be entered into the dose response curve (using the LDP Line program) for the combination to determine if the addition of the two materials would be less than, greater than or equal to theoretical additive toxicity number of 50%.

In an embodiment, a synergistic effect can be exhibited with the formulations of this disclosure.

Preferred embodiments of this disclosure are set forth in the clauses below.

1. A method for killing one or more biting arthropods selected from the group consisting of mosquitoes, bed bugs and ticks, the method comprising bringing the biting arthropods into contact with a toxic amount of a formulation comprising:

(1) one or more compounds of structure (I), wherein the compounds of structure (I) comprise:

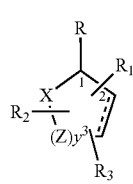

wherein
R is selected from the group consisting of —OH, =O, —OC(O)$R_4$, —O$R_6$, —(O$R_6$)$_2$, wherein each $R_6$ is independently selected from an alkyl group containing from 1 to 4 carbon atoms and $R_4$ is a branched or straight chain, saturated or unsaturated hydrocarbyl group with zero to two double bonds and from 1 to 15 carbon atoms;

X is O or $CH_2$, with the proviso that when X is O, then R can only be =O;

each Z is independently selected from the group consisting of (CH) and ($CH_2$);

y is a numeral selected from 1 and 2;

$R_1$ is selected from the group consisting of H or a branched or straight chain, saturated or unsaturated hydrocarbyl group with zero to two double bonds and from 1 to 15 carbon atoms;

$R_2$ is selected from the group consisting of H and a branched or straight chain, saturated or unsaturated hydrocarbyl group with zero to three double bonds and from 1 to 15 carbon atoms;

$R_3$ is selected from the group consisting of H and a branched or straight chain, saturated or unsaturated hydrocarbyl group with zero to three double bonds and from 1 to 15 carbon atoms, —($CH_2$)$_n$OH, —C(O)O$R_5$, —$CH_2$C(O)O$R_7$, —$CH_2$C(O)$R_8$, —C(O)N$R_9$$R_{10}$, —$CH_2$C(O)N$R_{11}$$R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (I) contain from 11 to 20 total carbon atoms; and (2) one or more toxicant compounds selected from the group consisting of pyrethroids, carbamates, and organophosphates.

2. The method according to clause 1 wherein the one or more compounds of structure (I) comprise a compound wherein R is =O or —OH, X is $CH_2$, Z is (CH) or ($CH_2$), y is 1, the bond between positions 2 and 3 is a single bond, $R_1$ is H, $R_2$ is H, and $R_3$ is an alkenyl group having at least 11 carbon atoms and 1 or 2 double bonds.

3. The method according to clause 1 wherein the one or more compounds of structure (I) comprise a compound wherein R is =O or —OH, X is $CH_2$, Z is (CH) or ($CH_2$), y is 1, the bond between positions 2 and 3 is a single bond, $R_1$ is an alkyl group having at least 5 carbon atoms, $R_2$ is H, and $R_3$ is —C(O)O$R_5$, and $R_5$ is an alkyl or alkenyl group containing at least 3 carbon atoms.

4. The method of clause 1 wherein the one or more compounds of structure (I) comprise a compound wherein R is =O, X is O, Z is CH or $CH_2$, y is 1 or 2, the bond between positions 2 and 3 is a single bond, $R_1$ is an alkyl group of from 7 to 11 carbon atoms, $R_2$ is H, and $R_3$ is H or $CH_3$.

5. The method according to clause 1 wherein the one or more compounds of structure (I) are selected from the group consisting of

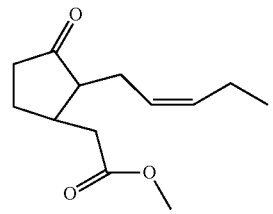

(Z)-methyl 2-(3-oxo-2-(pent-2-enyl)cyclopentyl)acetate
Chemical Formula: $C_{13}H_{20}O_3$
Molecular Weight: 224.30
Methyl Jasmonate

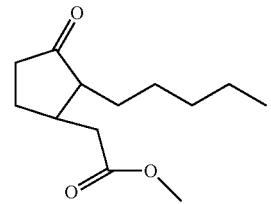

methyl 2-(3-oxo-2-pentylcyclopentyl)acetate
Chemical Formula: $C_{13}H_{22}O_3$
Molecular Weight: 226.31
Methyl Dihydro Jasmonate

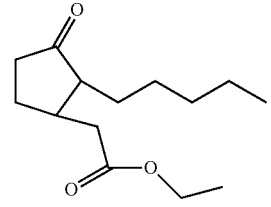

ethyl 2-(3-oxo-2-pentylcyclopentyl)acetate
Chemical Formula: $C_{14}H_{24}O_3$
Molecular Weight: 240.34
Ethyl Dihydro Jasmonate -continued

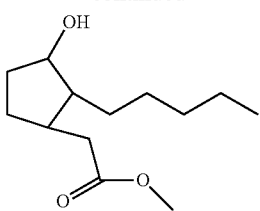

methyl 2-(3-hydroxy-2-pentylcyclopentyl)acetate
Chemical Formula: $C_{13}H_{24}O_3$
Molecular Weight: 228.33
Methyl Dihydro Jasmolate

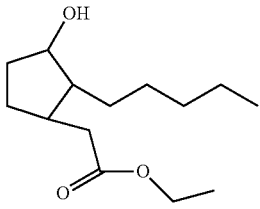

ethyl 2-(3-hydroxy-2-pentylcyclopentyl)acetate
Chemical Formula: $C_{14}H_{26}O_3$
Molecular Weight: 242.35
Ethyl Dihydro Jasmolate

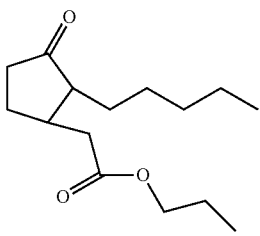

propyl 2-(3-oxo-2-pentylcyclopentyl)acetate
Chemical Formula: $C_{15}H_{26}O_3$
Molecular Weight: 254.37
Propyl Dihydro Jasmonate

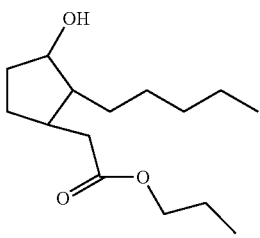

propyl 2-(3-hydroxy-2-pentylcyclopentyl)acetate
Chemical Formula: $C_{15}H_{28}O_3$
Molecular Weight: 256.38
Propyl Dihydro Jasmolate

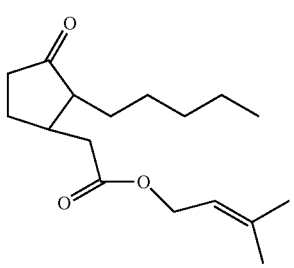

3-methylbut-2-enyl 2-(3-oxo-2-pentylcyclopentyl)acetate
Chemical Formula: $C_{17}H_{28}O_3$
Molecular Weight: 280.40
Prenyl Dihydro Jasmonate -continued

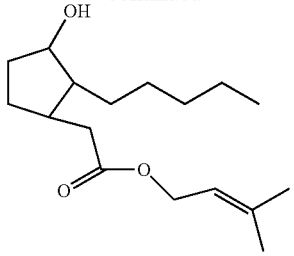

3-methylbut-2-enyl 2-(3-hydroxy-2-pentylcyclopentyl)acetate
Chemical Formula: $C_{17}H_{30}O_3$
Molecular Weight: 282.42
Prenyl Dihydro Jasmolate

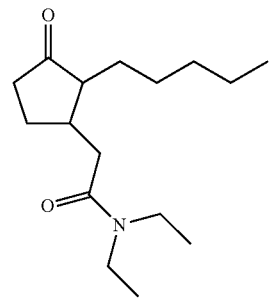

N,N-diethyl-2-(3-oxo-2-pentylcyclopentyl)acetamide
Chemical Formula: $C_{16}H_{29}NO_2$
Molecular Weight: 267.41
MDJ Amide

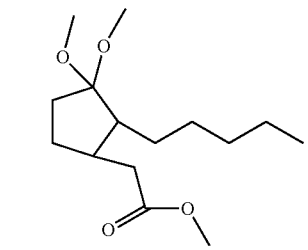

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

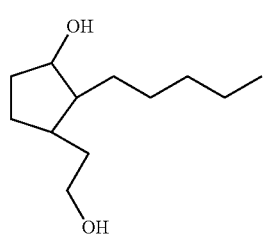

3-(2-hydroxyethyl)-2-pentylcyclopentanol
Chemical Formula: $C_{12}H_{24}O_2$
Molecular Weight: 200.32
MethylDihydroJasmodiol 6. The method according to clause 1 wherein the one or more compounds of structure (I) are selected from the group consisting of:

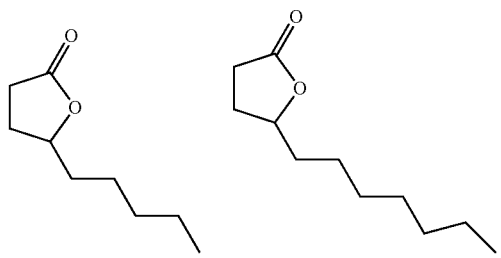

gamma Nonalactone
Chemical Formula: $C_9H_{16}O_2$
Molecular Weight: 156.22 gamma Undecalactone
Chemical Formula: $C_{11}H_{20}O_2$
Molecular Weight: 184.28

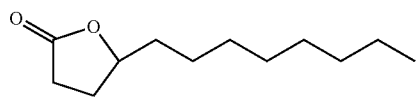

5-octyldihydrofuran-2(3H)-one
Chemical Formula: $C_{12}H_{22}O_2$
Molecular Weight: 198.30
gamma-dodecalactone

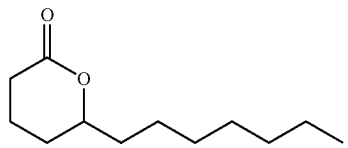

2H-Pyran-2-one, 6-heptyltetrahydro-
Chemical Formula: $C_{12}H_{22}O_2$
Molecular Weight: 198.31
Delta Dodecalactone

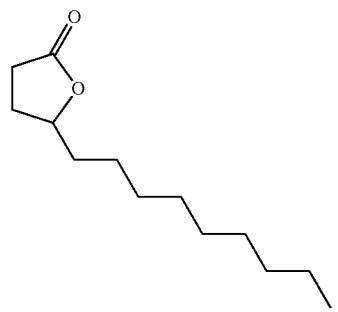

5-nonyldihydrofuran-2(3H)-one
Chemical Formula: $C_{13}H_{24}O_2$
Molecular Weight: 212.33
Gamma-Tridecalactone

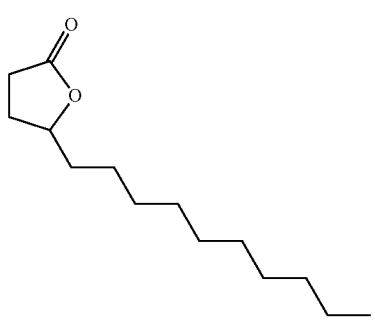

5-decyldihydrofuran-2(3H)-one
Chemical Formula: $C_{14}H_{26}O_2$
Molecular Weight: 226.36
Gamma-Tetradecalactone

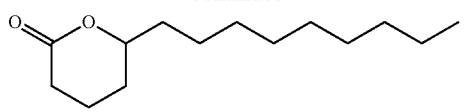

6-nonyltetrahydro-2H-pyran-2-one
Chemical Formula: $C_{14}H_{26}O_2$
Molecular Weight: 226.36
Delta-Tetradecalactone

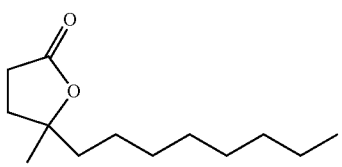

Gamma Methyl Dodecalactone
2(3H)-Furanone, 5-octyldihydro-5-methyl-

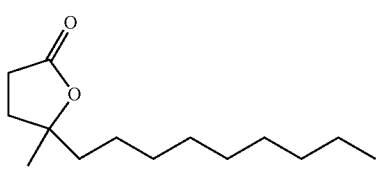

gamma Methyl Tridecalactone
5-Methyl-5-nonyldidydrofuran-2(3H)-one
4-methyl-4-nonyl gamma butyrolactone
C14 lactone 7. The method according to clause 1 wherein the one or more compounds of structure (I) are selected from the group consisting of

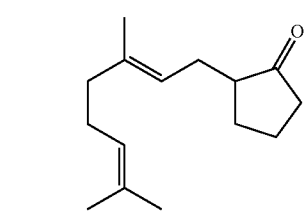

(E)-2-(3,7-dimethylocta-2,6-dienyl)cyclopentanone
Chemical Formula: $C_{15}H_{24}O$
Molecular Weight: 220.35
Apritone

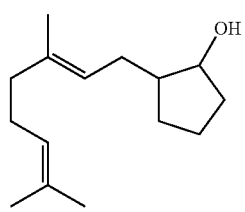

(E)-2-(3,7-dimethylocta-2,6-dienyl)cyclopentanol
Chemical Formula: $C_{15}H_{26}O$
Molecular Weight: 222.37
Apritol

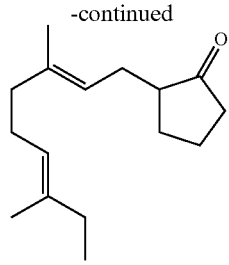

2-((2E,6E)-3,7-dimethylnona-2,6-dienyl)cyclopentanone
Chemical Formula: $C_{16}H_{26}O$
Molecular Weight: 234.38
Methyl Apritone

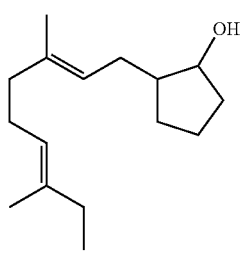

2-((2E,6E)-3,7-dimethylnona-2,6-dienyl)cyclopentanol
Chemical Formula: $C_{16}H_{28}O$
Molecular Weight: 236.39
Methyl Apritol

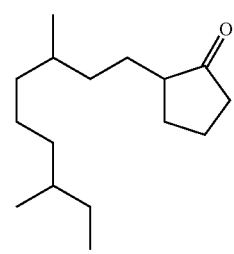

2-(3,7-dimethylnonyl)cyclopentanone
Chemical Formula: $C_{16}H_{30}O$
Molecular Weight: 238.41
Tetrahydromethyl Apritone

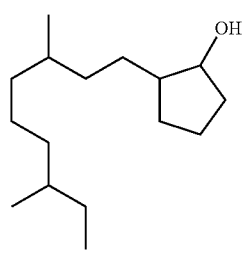

2-(3,7-dimethylnonyl)cyclopentanol
Chemical Formula: $C_{16}H_{32}O$
Molecular Weight: 240.42
Tetrahydromethyl Apritol 8. The method according to clause 1 wherein the one or more compounds of structure (I) are selected from the group consisting of:

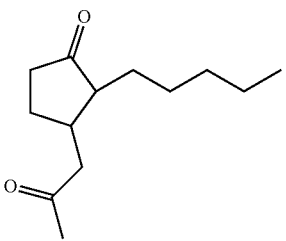

3-(2-oxopropyl)-2-pentylcyclopentanone
Chemical Formula: $C_{13}H_{22}O_2$
Molecular Weight: 210.31
Amyl Cyclopentanone Propanone

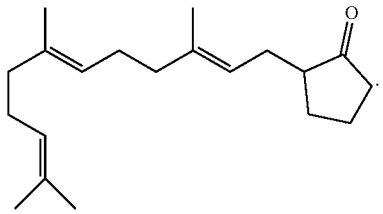

2-((2E,6E)-3,7,11-trimethyldodeca-2,6,10-trienyl)cyclopentanone
Chemical Formula: $C_{20}H_{32}O$
Molecular Weight: 288.47
Farnesylcyclopentanone 9. The method according to clause 1 wherein the one or more compounds of structure (I) are selected from the group consisting of

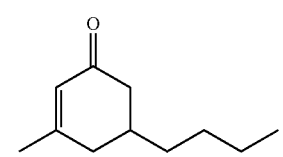

Chemical Formula: C11H18O
Molecular Weight: 166.26
3-methyl-5-butyl-2-cyclohexenone

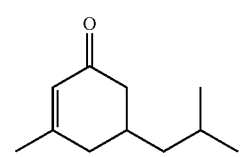

Chemical Formula: C11H18O
Molecular Weight: 166.26
3-methyl-5-isobutyl-2-cyclohexenone

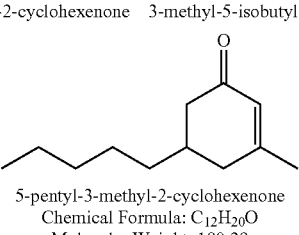

5-pentyl-3-methyl-2-cyclohexenone
Chemical Formula: $C_{12}H_{20}O$
Molecular Weight: 180.29

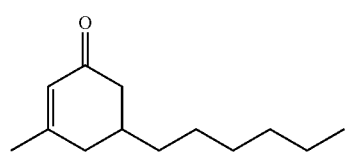

Chemical Formula: C13H22O
Molecular Weight: 194.31
3-methyl-5-hexyl-2-cyclohexenone -continued

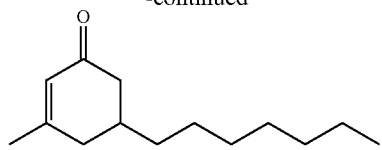

Chemical Formula: C14H24O
Molecular Weight: 208.34
3-methyl-5-heptyl-2-cyclohexenone

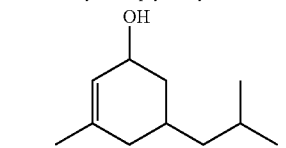

Chemical Formula: C11H20O
Molecular Weight: 168.28
3-methyl-5-isobutyl-2-cyclohexen-1-ol

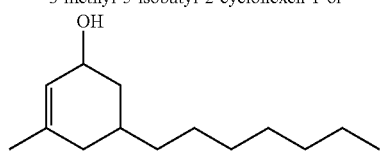

3-methyl-5-heptyl-2-cyclohexen-1-ol
Chemical Formula: C14H26O
Molecular Weight: 210.36

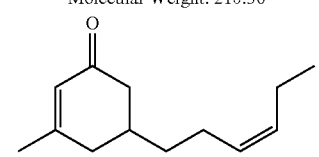

Chemical Formula: C13H20O
Molecular Weight: 192.30
3-methyl-5-(z-3-hexenyl)-2-cyclohexenone

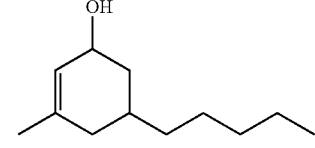

3-methyl-5-pentyl-2-cyclohexen-1-ol
Chemical Formula: C12H22O
Molecular Weight: 182.30

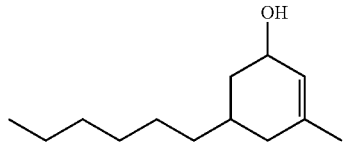

3-methyl-5-hexyl-2-cyclohexenol
Chemical Formula: $C_{13}H_{24}O$
Molecular Weight: 196.18

10. The method according to clause 1 wherein the formulation is applied to a surface of or impregnated into clothing of fabric.

11. The method according to clause 1 wherein the formulation is applied to detergents, fabric softeners, or dryer sheets.

12. The method according to clause 1 wherein the formulation is applied to furniture, building supplies, electronic devices, cargo, or storage areas.

13. The method according to clause 1 wherein the biting arthropod is brought into contact with the formulation comprising one or more of the compounds of structure (I) and a pyrethroid, wherein the pyrethroid is selected from the group consisting of bifenthrin, cypermethrin, zeta-cypermethrin, esfenvalerate, lambda-cyhalothrin, permethrin, cyfluthrin, alpha-cypermethrin, beta-cyfluthrin, tau-fluvalinate, gamma-cyhalothrin, deltamethrin, resmethrin, prallenthrin, fenpropathrin, tralomethrin, tetramethrin, and phenothrin.

14. The method according to clause 1 wherein the biting arthropod is brought into contact with the formulation comprising one or more of the compounds of structure (I) and a carbamate, wherein the carbamate is selected from the group consisting of carbaryl, propoxur, oxamyl, aldicarb, and terbucarb.

15. The method according to clause 1 wherein the biting arthropod is brought into contact with the formulation comprising one or more of the compounds of structure (I) and an organophosphate, wherein the organophosphate is selected from the group consisting of parathion, malathion, methyl parathion, chlorpyrifos, diazinon, dichlorvos, phosmet, fenitrothion, naled (dibrom), temephos, diazinon, and terbufos.

16. The method according to clause 1 wherein the one or more compounds of structure (I) comprise methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds comprise a pyrethroid.

17. The method according to clause 1 wherein the one or more compounds of structure (I) comprise methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds comprise a carbamate or an organophosphate.

18. The method according to clause 1 wherein the formulation is toxic to immature mosquitoes, immature bed bugs or immature ticks.

19. The method according to clause 1 wherein the formulation is present in an amount from about 0.00001 to about 50% by weight or greater, in a carrier, and in a weight ratio of one or more toxicant compounds to one or more compounds of structure (I) from about 1:1 to about 1:2000.

20. The method according to clause 1 wherein the formulation is applied to a surface of, or impregnated in, clothing or fabric, such that the amount of active material is about 0.0125 g/ft$^2$ to about 15 g/ft$^2$, or wherein the formulation is applied to an outdoor or indoor surface such that the amount of active material is about 0.125 g/m$^2$ to about 150 g/m$^2$.

21. The method according to clause 1 wherein the formulation is a synergistic formulation.

22. The method according to clause 21 wherein the synergistic formulation produces, when the biting arthropods are brought into contact with the synergistic formulation, a combined toxicant effect greater than the sum of the separate toxicant effects from the separate compounds of structure (I) and toxicant compounds, at comparable concentrations.

23. The method according to clause 1 wherein, when the one or more biting arthropods are bed bugs, then y is 1.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

Examples

Protocols for mosquito toxicity assessment of compounds used in the Examples are set forth below.

CDC Bottle Assay

Solutions were prepared and the bottles coated according to the CDC protocol. Ten unfed female mosquitoes aged 3-5 days were introduced into four 250 ml Wheaton bottles coated with experimental compound with and without the conventional pyrethroid pesticide (i.e., Deltamethrin) and one control bottle coated with acetone only. The number of dead or alive mosquitoes was monitored at different time intervals (15, 30, 45, 60 minutes). This allowed time to determine the total percent mortality against time for all replicates.

Figure 2:
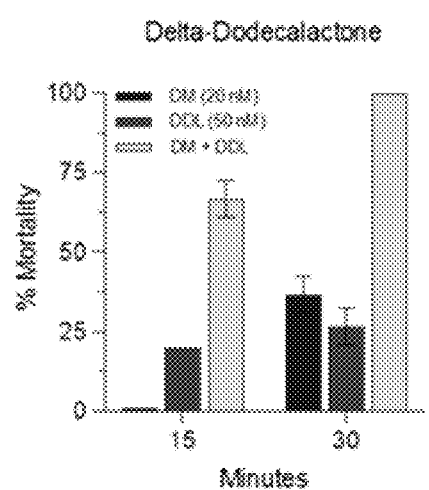
FIG. 2 graphically shows percent mortality for *Aedes aegypti* 3-5 d females with delta dodecalactone (DDL), Deltamethrin (DM), and delta dodecalactone (DDL)/Deltamethrin (DM) mixture using protocols in accordance with the Examples.
Figure 3:
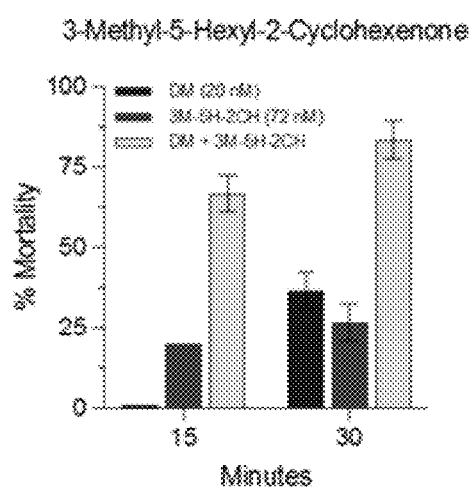
FIG. 3 graphically shows percent mortality for *Aedes aegypti* 3-5 d females with 3-methyl-5-hexyl-2-cyclohexenone (3M-5H-2CH), Deltamethrin (DM), and 3-methyl-5-hexyl-2-cyclohexenone (3M-5H-2CH)/Deltamethrin (DM) mixture using protocols in accordance with the Examples.
Figure 4:
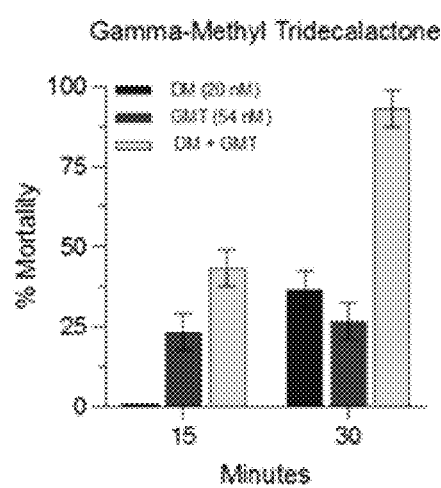
FIG. 4 graphically shows percent mortality for *Aedes aegypti* 3-5 d females with gamma-methyl tridecalactone (GMT), Deltamethrin (DM), and gamma-methyl tridecalactone (GMT)/Deltamethrin (DM) mixture using protocols in accordance with the Examples.

Mosquito CDC bottle bioassays with Deltamethrin and compounds of this disclosure were conducted in accordance with the above protocol. The mosquitoes were *Aedes aegypti* 3-5 d females. FIG. 1 graphically shows percent mortality for *Aedes aegypti* 3-5 d females with Deltamethrin (DM) using above protocol. FIG. 2 graphically shows percent mortality for *Aedes aegypti* 3-5 d females with delta dodecalactone (DDL), Deltamethrin (DM), and delta dodecalactone (DDL)/Deltamethrin (DM) mixture using above protocol. FIG. 3 graphically shows percent mortality for *Aedes aegypti* 3-5 d females with 3-methyl-5-hexyl-2-cyclohexenone (3M-5H-2CH), Deltamethrin (DM), and 3-methyl-5-hexyl-2-cyclohexenone (3M-5H-2CH)/Deltamethrin (DM) mixture using above protocol. FIG. 4 graphically shows percent mortality for *Aedes aegypti* 3-5 d females with gamma-methyl tridecalactone (GMT), Deltamethrin (DM), and gamma-methyl tridecalactone (GMT)/Deltamethrin (DM) mixture using above protocol.

What is claimed is:

1. A method for killing one or more biting arthropods selected from the group consisting of mosquitoes, bed bugs and ticks, the method comprising bringing the biting arthropods into contact with a toxic amount of a formulation comprising:

(1) one or more compounds of structure (I), wherein the compounds of structure (I) are selected from:

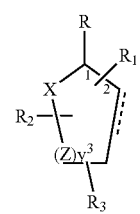

(I)

wherein
R is selected from the group consisting of —OH, =O, —OC(O)R$_4$, —OR$_6$, —(OR$_6$)$_2$, wherein each R$_6$ is independently selected from an alkyl group containing from 1 to 4 carbon atoms and R$_4$ is a branched or straight chain, saturated or unsaturated hydrocarbyl group with zero to two double bonds and from 1 to 15 carbon atoms;

X is O or CH$_2$, with the proviso that when X is O, then R can only be =O;

each Z is independently selected from the group consisting of (CH) and (CH$_2$);

y is a numeral selected from 1 and 2;

R$_1$ is selected from the group consisting of H or a branched or straight chain, saturated or unsaturated hydrocarbyl group with zero to two double bonds and from 1 to 15 carbon atoms;

R$_2$ is selected from the group consisting of H and a branched or straight chain, saturated or unsaturated hydrocarbyl group with zero to three double bonds and from 1 to 15 carbon atoms;

R$_3$ is selected from the group consisting of H and a branched or straight chain, saturated or unsaturated hydrocarbyl group with zero to three double bonds and from 1 to 15 carbon atoms, —(CH$_2$)$_n$OH, —C(O)OR$_5$, —CH$_2$C(O)OR$_7$, —CH$_2$C(O)R$_8$, —C(O)NR$_9$R$_{10}$, —CH$_2$C(O)NR$_{11}$R$_{12}$ where each of R$_5$, R$_7$, R$_8$, R$_9$, R$_{10}$, R$_{11}$ and R$_{12}$ is independently selected from H and a branched or straight chain, saturated or unsaturated hydrocarbyl group with zero to three double bonds and from 1 to 15 carbon atoms and n is an integer of from 1 to 12;

the bond between the 2 and 3 positions in the ring structure may be a single or a double bond; and wherein the compounds of structure (I) contain from 11 to 20 total carbon atoms; and (2) one or more toxicant compounds selected from the group consisting of pyrethroids, carbamates, and organophosphates;

wherein the formulation is present in an amount from about 0.00001 to about 50% by weight or greater, in a carrier, and in a weight ratio of one or more toxicant compounds to one or more compounds of structure (I) from about 1:1 to about 1:2000.

2. The method according to claim 1 wherein the one or more compounds of structure (I) comprise a compound wherein R is =O or —OH, X is CH$_2$, Z is (CH) or (CH$_2$), y is 1, the bond between positions 2 and 3 is a single bond, R$_1$ is H, R$_2$ is H, and R$_3$ is an alkenyl group having at least 11 carbon atoms and 1 or 2 double bonds; or wherein the one or more compounds of structure (I) comprise a compound wherein R is =O or —OH, X is CH$_2$, Z is (CH) or (CH$_2$), y is 1, the bond between positions 2 and 3 is a single bond, R$_1$ is an alkyl group having at least 5 carbon atoms, R$_2$ is H, and R$_3$ is C(O)OR$_5$, and R$_5$ is an alkyl or alkenyl group containing at least 3 carbon atoms; or wherein the one or more compounds of structure (I) comprise a compound wherein R is =O, X is O, Z is CH or CH$_2$, y is 1 or 2, the bond between positions 2 and 3 is a single bond, R$_1$ is an alkyl group of from 7 to 11 carbon atoms, R$_2$ is H, and R$_3$ is H or CH$_3$.

3. The method according to claim 1 wherein the one or more compounds of structure (I) are selected from the group consisting of

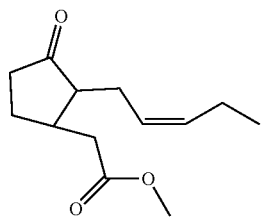

(Z)-methyl 2-(3-oxo-2-(pent-2-enyl)cyclopentyl)acetate
Chemical Formula: C$_{13}$H$_{20}$O$_3$
Molecular Weight: 224.30
Methyl Jasmonate

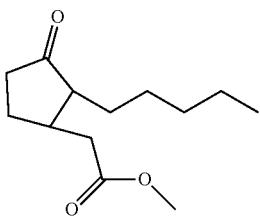

methyl 2-(3-oxo-2-pentylcyclopentyl)acetate
Chemical Formula: C$_{13}$H$_{22}$O$_3$
Molecular Weight: 226.31
Methyl Dihydro Jasmonate ethyl 2-(3-oxo-2-pentylcyclopentyl)acetate
Chemical Formula: C$_{14}$H$_{24}$O$_3$
Molecular Weight: 240.34
Ethyl Dihydro Jasmonate

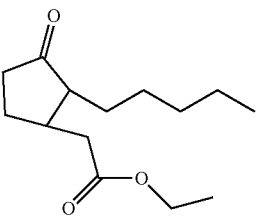

methyl 2-(3-hydroxy-2-pentylcyclopentyl)acetate
Chemical Formula: C$_{13}$H$_{24}$O$_3$
Molecular Weight: 228.33
Methyl Dihydro Jasmolate -continued

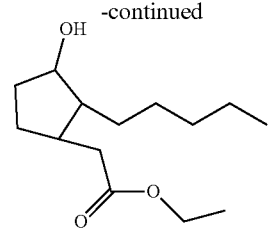

ethyl 2-(3-hydroxy-2-pentylcyclopentyl)acetate
Chemical Formula: C$_{14}$H$_{26}$O$_3$
Molecular Weight: 242.35
Ethyl Dihydro Jasmolate

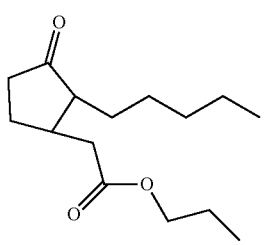

propyl 2-(3-oxo-2-pentylcyclopentyl)acetate
Chemical Formula: C$_{15}$H$_{26}$O$_3$
Molecular Weight: 254.37
Propyl Dihydro Jasmonate

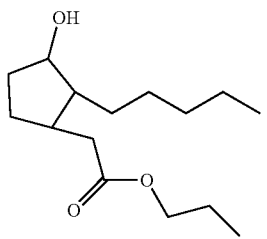

propyl 2-(3-hydroxy-2-pentylcyclopentyl)acetate
Chemical Formula: C$_{15}$H$_{28}$O$_3$
Molecular Weight: 256.38
Propyl Dihydro Jasmolate

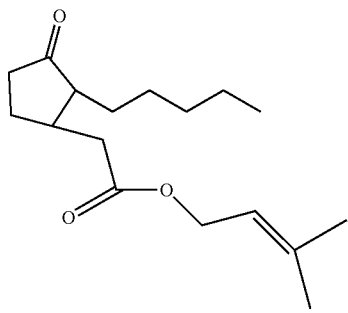

3-methylbut-2-enyl 2-(3-oxo-2-pentylcyclopentyl)acetate
Chemical Formula: C$_{17}$H$_{28}$O$_3$
Molecular Weight: 280.40
Prenyl Dihydro Jasmonate

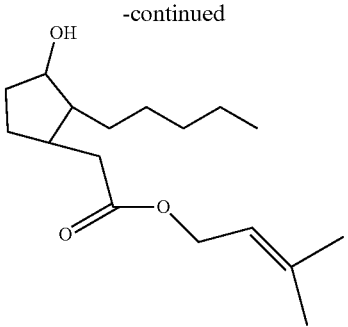

3-methylbut-2-enyl 2-(3-hydroxy-2-pentylcyclopentyl)acetate
Chemical Formula: $C_{17}H_{30}O_3$
Molecular Weight: 282.42
Prenyl Dihydro Jasmolate

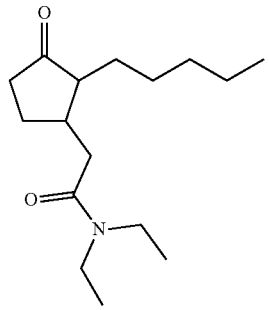

N,N-diethyl-2-(3-oxo-2-pentylcyclopentyl)acetamide
Chemical Formula: $C_{16}H_{29}NO_2$
Molecular Weight: 267.41
MDJ Amide

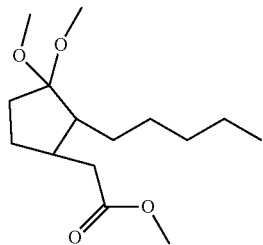

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

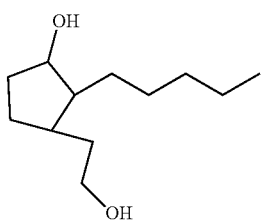

3-(2-hydroxyethyl)-2-pentylcyclopentanol
Chemical Formula: $C_{12}H_{24}O_2$
Molecular Weight: 200.32
MethylDihydroJasmodiol.

4. The method according to claim 1 wherein the one or more compounds of structure (I) are selected from the group consisting of:

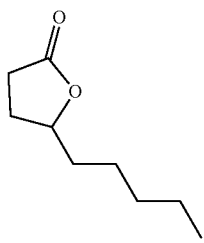 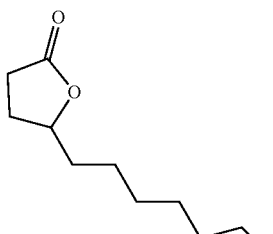

gamma Nonalactone
Chemical Formula: $C_9H_{16}O_2$
Molecular Weight: 156.22 gamma Undecalactone
Chemical Formula: $C_{11}H_{20}O_2$
Molecular Weight: 184.28

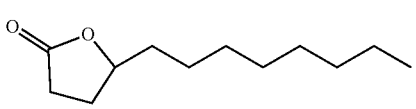

5-octyldihydrofuran-2(3H)-one
Chemical Formula: $C_{12}H_{22}O_2$
Molecular Weight: 198.30
gamma-dodecalactone

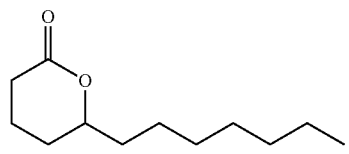

2H-Pryan-2-one, 6-heptyltetrahydro-
Chemical Formula: $C_{12}H_{22}O_2$
Molecular Weight: 198.31
Delta Dodecalactone

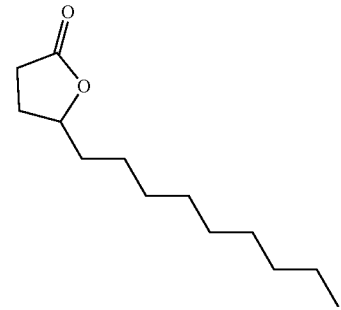

5-nonyldihydrofuran-2(3H)-one
Chemical Formula: $C_{13}H_{24}O_2$
Molecular Weight: 212.33
Gamma-Tridecalactone

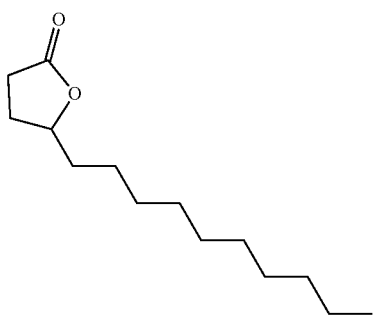

5-decyldihydrofuran-2(3H)-one
Chemical Formula: $C_{14}H_{26}O_2$
Molecular Weight: 226.36
Gamma-Tetradecalactone -continued

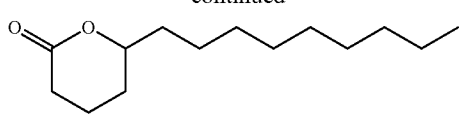

6-nonyltetrahydro-2H-pyran-2-one
Chemical Formula: $C_{14}H_{26}O_2$
Molecular Weight: 226.36
Delta-Tetradecalactone

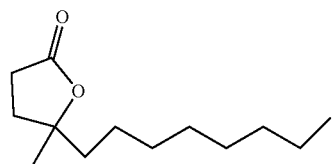

Gamma Methyl Dodecalactone
2(3H)-Furanone, 5-octyldihydro-5-methyl-

gamma Methyl Tridecalactone
5-Methyl-5-nonyldihydrofuran-2(3H)-one
4-methyl-2-nonyl gamma butyrolactone
C14 lactone.

5. The method according to claim 1 wherein the one or more compounds of structure (I) are selected from the group consisting of

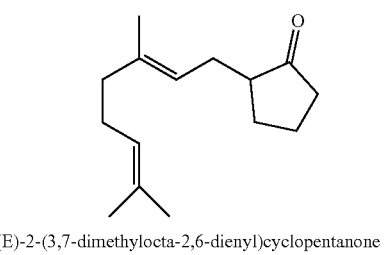

(E)-2-(3,7-dimethylocta-2,6-dienyl)cyclopentanone
Chemical Formula: $C_{15}H_{24}O$
Molecular Weight: 220.35
Apritone

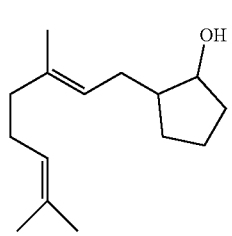

(E)-2-(3,7-dimethylocta-2,6-dienyl)cyclopentanol
Chemical Formula: $C_{15}H_{26}O$
Molecular Weight: 222.37
Apritol -continued

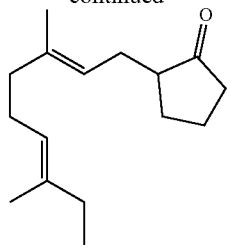

2-((2E,6E)-3,7-dimethylnona-2,6-dienyl)cyclopentanone
Chemical Formula: $C_{16}H_{26}O$
Molecular Weight: 234.38
Methyl Apritone

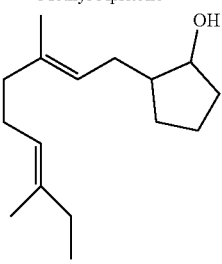

2-((2E,6E)-3,7-dimethylnona-2,6-dienyl)cyclopentanol
Chemical Formula: $C_{16}H_{28}O$
Molecular Weight: 236.39
Methyl Apritol

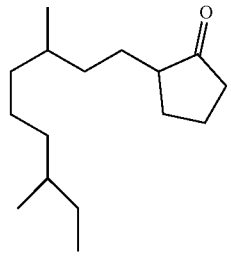

2-(3,7-dimethylnonyl)cyclopentanone
Chemical Formula: $C_{16}H_{30}O$
Molecular Weight: 238.41
Tetrahydromethyl Apritone

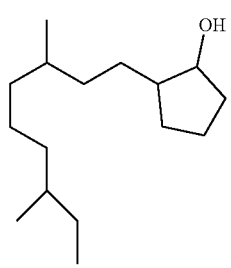

2-(3,7-dimethylnonyl)cyclopentanol
Chemical Formula: $C_{16}H_{32}O$
Molecular Weight: 240.42
Tetrahydromethyl Apritol.

6. The method according to claim 1 wherein the one or more compounds of structure (I) are selected from the group consisting of:

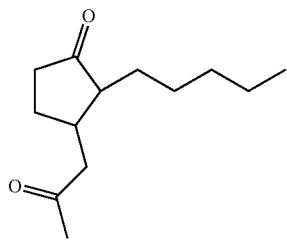

3-(2-oxopropyl)-2-pentylcyclopentanone
Chemical Formula: $C_{13}H_{22}O_2$
Moleular Weight: 210.31
Amyl Cyclopentanone Propanone

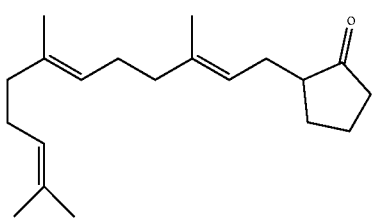

2-((2E,6E)-3,7,11-trimethyldodeca-2,6,10-trienyl)cyclopentanone
Chemical Formula: L $C_{20}H_{32}O$
Molecular Weight: 288.47
Farnesylcyclopentanone 7. The method according to claim 1 wherein the one or more compounds of structure (I) are selected from the group consisting of

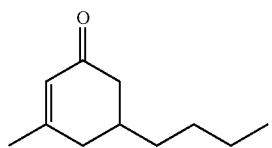

Chemical Formula: C11H18O
Molecular Weight: 166.36
3-methyl-5-butyl-2-cyclohexenone

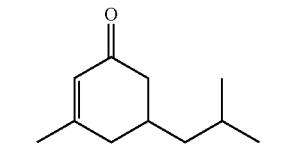

Chemical Formula: C11H18O
Molecular Weight: 166.26
3-methyl-5-isobutyl-2-cyclohexenone

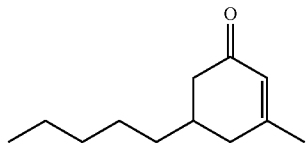

5-pentyl-3-methyl-2-cyclohexenone
Chemical Formula: $C_{12}H_{20}O$
Molecular Weight: 180.29

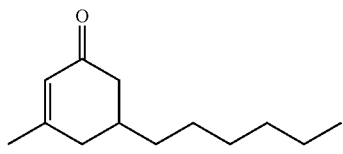

Chemical Formula: C13H22O
Molecular Weight: 194.31
3-methyl-5-hexyl-2-cyclohexenone

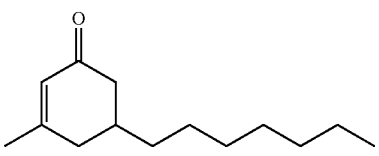

Chemical Formula: C14H24O
Molecular Weight: 203.34
3-methyl-5-heptyl-2-cyclohexenone

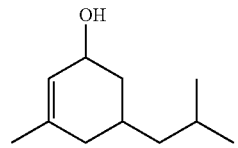

Chemical Formula: C11H20O
Molecular Weight: 168.28
3-methyl-5-isobutyl-2-cyclohexen-1-ol

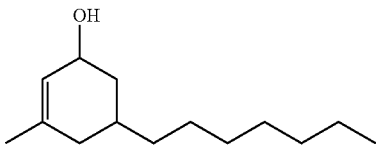

3-methyl-5-heptyl-2-cyclohexen-1-ol
Chemical Formula: C14H26O
Molecular Weight: 210.36

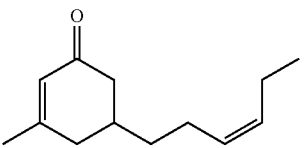

Chemical Formula: C13H20O
Molecular Weight: 192.30
3-methyl-5-(z-3-hexenyl)-2-cyclohexenone

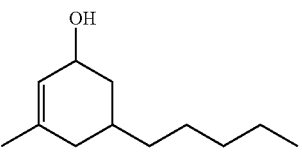

3-methyl-5-pentyl-2-cyclohexen-1-ol
Chemical Formula: C12H22O
Molecular Weight: 182.30

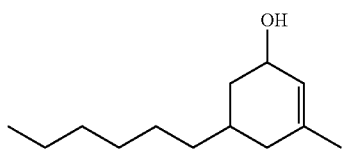

3-methyl-5-hexyl-2-cyclohexenol
Chemical Formula: $C_{13}H_{24}O$
Molecular Weight: 196.18.

8. The method according to claim 1 wherein the formulation is applied to a surface of or impregnated into clothing of fabric.

9. The method according to claim 1 wherein the formulation is applied to detergents, fabric softeners, or dryer sheets.

10. The method according to claim 1 wherein the formulation is applied to furniture, building supplies, electronic devices, cargo, or storage areas.

11. The method according to claim 1 wherein the biting arthropod is brought into contact with the formulation comprising one or more of the compounds of structure (I) and a pyrethroid, wherein the pyrethroid is selected from the group consisting of bifenthrin, cypermethrin, zeta-cypermethrin, esfenvalerate, lambda-cyhalothrin, permethrin, cyfluthrin, alpha-cypermethrin, beta-cyfluthrin, tau-fluvalinate, gamma-cyhalothrin, deltamethrin, resmethrin, prallenthrin, fenpropathrin, tralomethrin, tetramethrin, and phenothrin.

12. The method according to claim 1 wherein the biting arthropod is brought into contact with the formulation comprising one or more of the compounds of structure (I) and a carbamate, wherein the carbamate is selected from the group consisting of carbaryl, propoxur, oxamyl, aldicarb, and terbucarb.

13. The method according to claim 1 wherein the biting arthropod is brought into contact with the formulation comprising one or more of the compounds of structure (I) and an organophosphate, wherein the organophosphate is selected from the group consisting of parathion, malathion, methyl parathion, chlorpyrifos, diazinon, dichlorvos, phosmet, fenitrothion, naled (dibrom), temephos, diazinon, and terbufos.

14. The method according to claim 1 wherein the one or more compounds of structure (I) are selected from methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds is a pyrethroid.

15. The method according to claim 1 wherein the one or more compounds of structure (I) are selected from methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds are selected from a carbamate or an organophosphate.

16. The method according to claim 1 wherein the formulation is toxic to immature mosquitoes, immature bed bugs or immature ticks.

17. The method according to claim 1 wherein the formulation is applied to a surface of, or impregnated in, clothing or fabric, such that the amount of active material is about 0.0125 g/ft$^2$ to about 15 g/ft$^2$, or wherein the formulation is applied to an outdoor or indoor surface such that the amount of active material is about 0.125 g/m$^2$ to about 150 g/m$^2$.

18. The method according to claim 1 wherein the formulation is a synergistic formulation; wherein the synergistic formulation produces, when the biting arthropods are brought into contact with the synergistic formulation, a combined toxicant effect greater than the sum of the separate toxicant effects from the separate compounds of structure (I) and toxicant compounds, at comparable concentrations.

19. The method according to claim 1 wherein the one or more compounds of structure (I) are selected from methyl jasmonate, methyl dihydrojasmonate, methyl dihydrojasmolate (methyl 2-(3-hydroxy-2-pentylcyclopentyl)acetate), ethyl dihydrojasmonate, propyl dihydrojasmonate, apritone (cyclopentanone, 2-(3,7-dimethyl-2,6-octadienyl)-), methyl apritone (cyclopentanone, 2-(3,7-dimethyl-2,6-nonadien-1-yl)-), delta-dodecalactone, gamma-dodecalactone, gamma-undecalactone, gamma methyl dodecalactone, gamma-tridecalactone, gamma methyl tridecalactone, gamma-tetradecalactone, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, or 3-methyl-5-heptyl-2-cyclohexenone, and the one or more toxicant compounds is a pyrethroid.

* * * * *